July 14, 1936.  C. W. F. HAMILTON  2,047,867
APPARATUS FOR LOADING OR DUMPING SPOIL OR OTHER SUITABLE MATERIALS
Filed Oct. 3, 1933   3 Sheets-Sheet 1
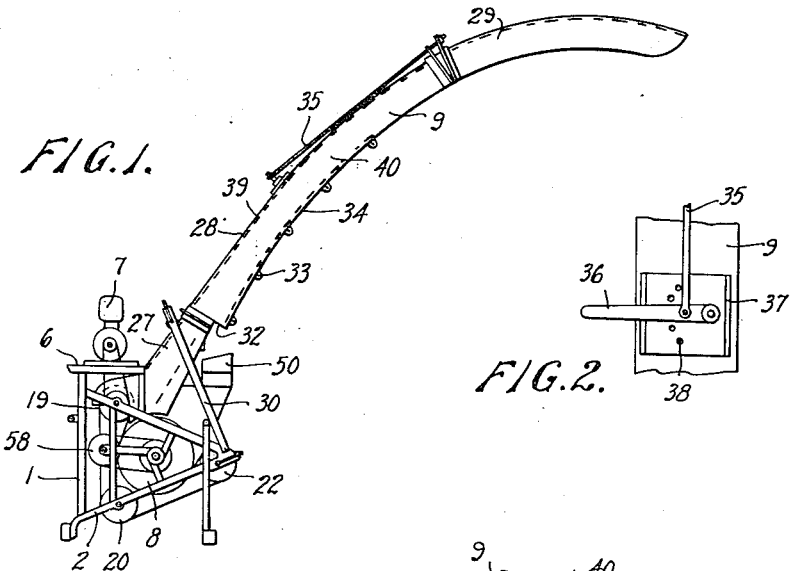
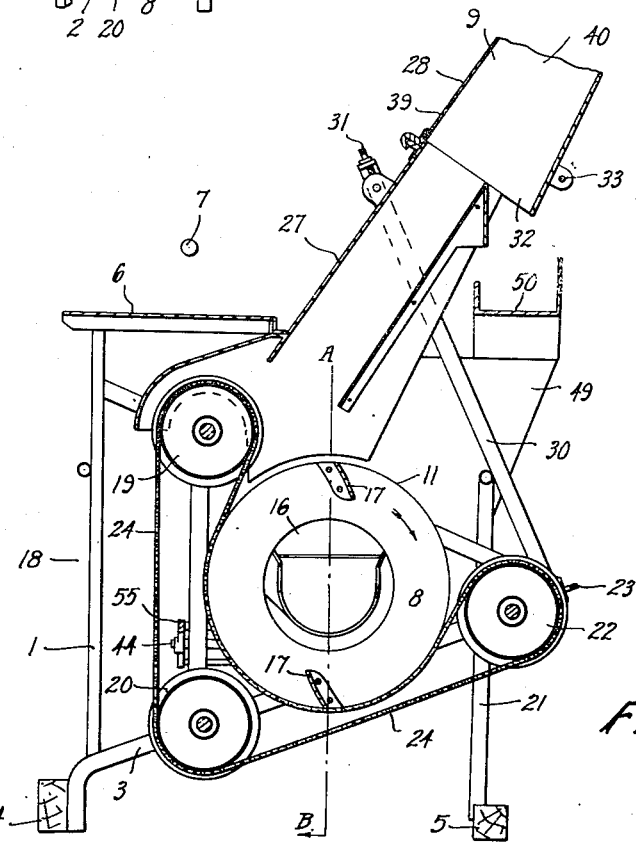
C. W. F. Hamilton
INVENTOR
By: Marks & Clark
Attys.

July 14, 1936.  C. W. F. HAMILTON  2,047,867
APPARATUS FOR LOADING OR DUMPING SPOIL OR OTHER SUITABLE MATERIALS
Filed Oct. 3, 1933   3 Sheets-Sheet 2

C. W. F. Hamilton
INVENTOR

By Marks & Clerk
Attys.

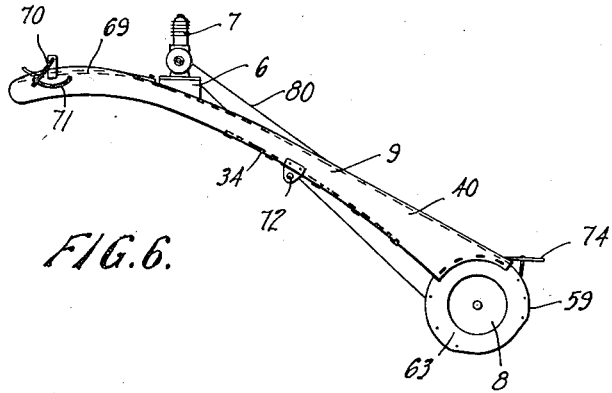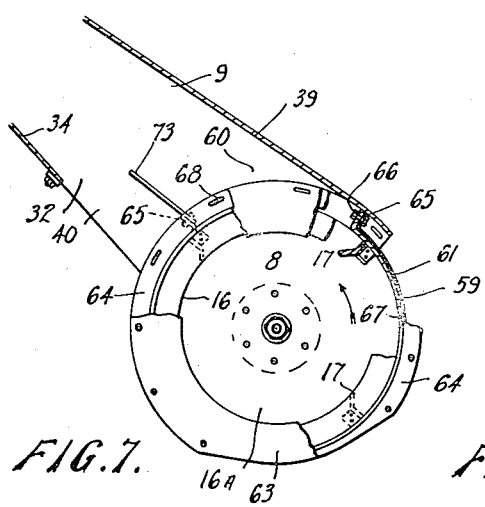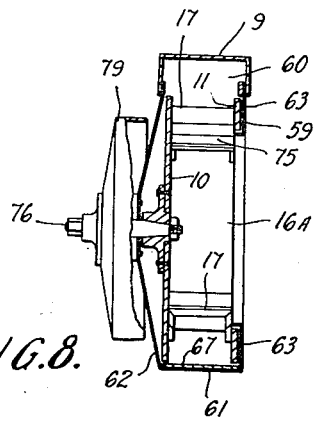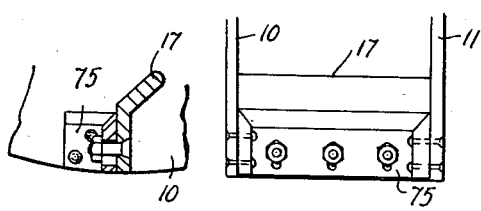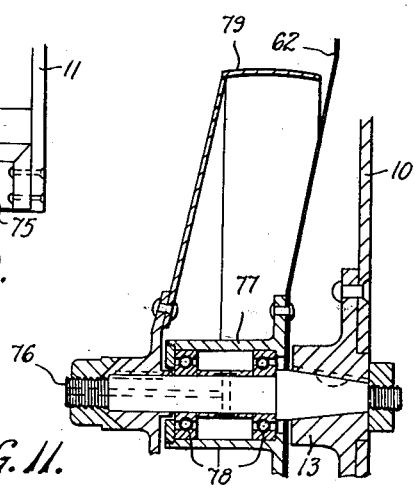

Patented July 14, 1936

2,047,867

UNITED STATES PATENT OFFICE 2,047,867

APPARATUS FOR LOADING OR DUMPING SPOIL OR OTHER SUITABLE MATERIALS

Charles William Feilden Hamilton, Irishman Creek Station, Fairlie, New Zealand

Application October 3, 1933, Serial No. 692,004
In New Zealand October 5, 1932

3 Claims. (Cl. 209—257)

The present invention has for its object the cheap and rapid mechanical loading, elevation, or movement of spoil, shingle or other substances by an improved mechanism, the invention having for its underlying principle the use of centrifugal force for ejecting spoil inserted into suitably disposed rotor means for the loading, elevating or dumping of said spoil.

The invention may be applied in many ways, but without limiting the generality of the underlying principle hereinbefore stated, two constructional embodiments of the invention will be described, one, in the form of a light loader used either as part of the permanent equipment of a lorry or as a separate unit for filling a lorry or other vehicle with spoil, shingle or other substances and the other as a permanent or readily collapsible loader having a mechanical screen and feeder means incorporated in the apparatus which extend the convenience and use of same.

Briefly the invention may be said to consist of a vertically disposed rotor into the side of the casing of which the spoil or other substance to be elevated or moved is fed by novel shaking and screening means, means being also provided for holding the material within the rotor casing for a portion of the rotation of the rotor, while a gap is also provided in the casing near the top through which the spoil is thrown, elongated chute means being associated with the gap to guide the flying spoil to the desired point of disposal.

In describing the invention reference will be made to the accompanying drawings in which:—

Figure 1 shows an end elevation of the preferred form of apparatus which incorporates a mechanical screen and feeder.

Figure 2 is an enlarged plan view of the end section adjustment lever means of the chute of Figure 1.

Figure 3 is a sectional end elevation of the apparatus.

Figure 6 shows a side elevation of the light loader type of apparatus for attachment to a lorry or for use as a separate unit.

Figure 7 is a partially sectioned side elevation thereof.

Figure 8 is a sectional end elevation of Figure 7.

Figure 4:
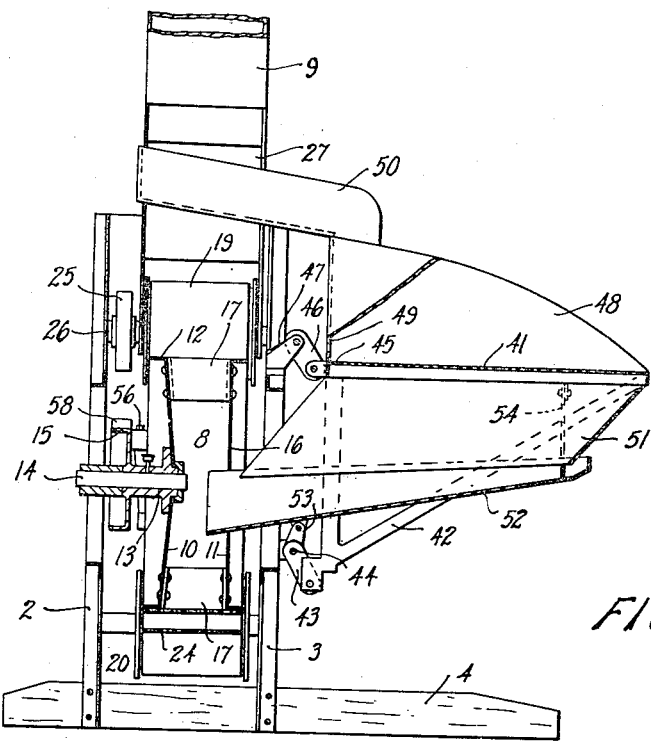
Figure 4 is a sectional elevation on line A—B of Figure 3.
Figure 5:
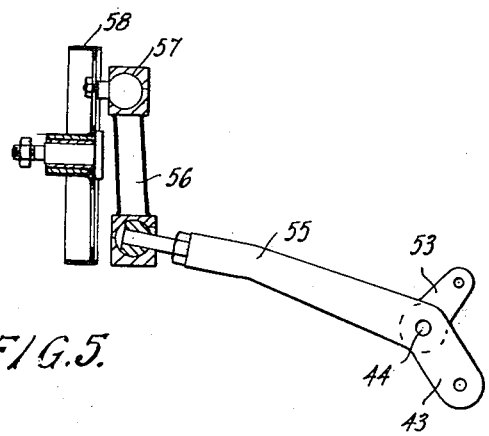
Figure 5 shows an enlarged view of the screen and feeder driving mechanism.

Figure 9 in an enlarged sectional side elevation of one of the blades and attaching brackets, Figure 10 is an elevation of Figure 9 and Figure 11 is an enlarged sectional elevation of the driving pulley and shaft bearing means.

The preferred form of the invention as in Figures 1 to 5 will be first described, this form comprising a main frame 1 of suitable structural form having preferably two sides 2 and 3 mounted to base members 4 and 5 and an engine bed 6 on which an engine 7 or other suitable driving means is mounted.

Between the two sides 2 and 3, the rotor 8 and the chute 9 are mounted, the rotor 8 comprising (see Figure 4) two discs 10 and 11 with outwardly projecting peripheral flanges 12, the disc 10 being revolvably mounted by its central boss 13 on a rigid shaft 14 which is secured to frame side 2, the boss 13 having a pulley 15 mounted thereon, the disc 11 which is of ring form having a central admission hole 16 and being connected to the disc 10 only by two diametrally opposite wear resisting material blades 17 preferably curved in the direction of rotation (as shown in Figure 3).

To the rear 18 of the frame 1 (see Figure 3) two broad flanged pulleys 19 and 20 are revolvably mounted and to the front 21 of the frame 1 a similar pulley 22 is provided, this latter having tension adjustment means 23 of known type for applying tension to a broad belt 24 (preferably of rubber) which passes over the pulleys 19, 20 and 22 and contacts the periphery of the rotor 8 at the bottom and up one side thereof as shown in Figure 3.

The uppermost broad flanged pulley 19 is provided with a drive pulley 25 or like to its shaft 26 (see Figure 4) to receive suitable drive such as by belt from the engine 7.

The chute 9 is made up of preferably three detachable sections 27, 28 and 29, the bottom section 27 being supported by projecting under the engine bed 6 (see Figure 3) and having two stays 30 at opposite sides thereof which are fastened at their lower ends to frame sides 2 and 3 and have adjustment means 31 at the upper ends so as to enable adjustment or variation of the chute angle.

The middle section 28 is slightly broader at its lower end than the top of the bottom section 27 so as to leave a return opening 32, lugs 33 being provided to this section 28 for the removable attachment of a bottom 34 which extends not quite to the top of this section 28.

The top or end section 29 (see Figure 1) is open at the bottom having only a top and sides this section 29 being capable of independent raising or lowering by being held on to the middle section 28 by a rod 35 which passes down to an adjustment lever 36 (see Figure 2) pivotally secured to a plate 37 on the top of middle section 28, this plate 37 having a series of adjustment holes 38 for engagement of the lever 36 in known manner.

With the chute 9 assembled, a continuous top 39 and sides 40 are presented to the spoil to confine it to a desired course, the shape of said chute 9 being suited to conform with the natural trajectory of spoil or substance thrown by the rotor 8.

To the outside of frameside 3 the screen and feeder apparatus is mounted (see Figure 4) the screen 41 of desired mesh being mounted on two frames 42 which, in the vicinity of the frame side 3 are connected at their bottoms to two downward arms 43 of a shaker shaft 44 rotatably mounted on the frame side 3, a member 45 connecting the tops of the screen frames 42 having a link 46 connecting it to a bracket 47 secured to frame side 3.

Above the screen 41 there are sides 48 and a back 49 and from the latter a run back chute 50 passes to just below return opening 32 of chute 9.

Below the screen 41 suitable guide plates 51 direct the screened spoil to the feeder 52 which is inclined downwardly from its outer end and projects through the admission hole 16 of the rotor 8, the feeder 52 at this end being carried by upward arms 53 on the shaker shaft 44, the outer end of the feeder 52 being flexibly secured to the screen 41 by such means as spring steel supports 54.

The shaker shaft 44 is adapted to partially and sharply rotate in reverse directions so as to cause the screen 41 and feeder 52 to move reciprocally and in reverse directions, this motion of the shaker shaft 44 being imparted by an arm 55 (see Figure 5) secured to shaker shaft 44 which passes to a ball socketed connecting rod 56 which is connected to a ball type crankpin 57 adjustably secured to a pulley 58 suitably rotatably mounted to frame 2 (see Figure 1) and adapted to receive a belt drive from the rotor pulley 15.

Now referring to the light type of loader as in Figures 6 to 11, this type also has the rotor 8 and chute 9, but instead of having the belt 24 covering portion of the periphery so as to leave a gap from which the material is thrown from the rotor 8, a drum 59 encloses the rotor 8 and the chute 9 is secured to the drum 59 in the vicinity of a peripheral gap 60 therein.

This drum 59 comprises (see Figure 8) a short cylindrical ring 61 with a dished end 62 to one side thereof and a detachable retaining ring 63 to the other, the latter having the admission hole 16a therein.

The cylindrical ring 61 has the edge thereof next to the retaining ring 63 turned to form a flange 64 (see Figure 7) to permit of the attachment of said retaining ring 63 by bolt means or like, the cylindrical ring 61 not being continuous but having the peripheral gap 60 adapted to coincide with chute 9.

The ends 65 of the cylindrical ring 61 between which gap 60 is located (see Figure 7) project outwardly to enable bolt means 66 to secure a hard wear resisting liner 67 which covers the inner face of the cylindrical ring 61.

The chute 9 is secured to the drum 59 by bolts passing through slotted holes 68 in said chute sides 40 so as to permit of peripheral adjustment movements of the chute 9 in relation to the drum 59 the chute 9 being secured to the drum over the gap 60.

The chute 9 may be constructed in three sections as in Figure 1 or as a single member as in Figure 6 and in the latter case the top 39 would not be continuous but would terminate at the commencement of a tongue 69 adapted to give deflection control, this tongue 69 which is free at its outer end being adapted to be adjustably depressed by the operation of lever means 70 having notched quadrant engaging means 71.

In this case, the engine bed 6 is provided on top of the chute 9 for the mounting thereto of the engine 7 and pivot means 72 are provided secured to the chute sides 40.

The lower edge of the gap 60 has a deflecting plate 73 secured therto projecting into the chute 9 and handle means 74 (Figure 6) may be secured to the drum 59.

Within drum 59 there is rotor 8 comprising discs 10 and 11 as in Figure 4 but no peripheral flanges 12, there being preferably four blades 17 between discs 10 and 11 adjustably mounted on brackets 75 which are secured to said discs 10 and 11.

The rotor 8 has a boss 13 (see Figure 11) to its disc 10 said boss 13 in this case being keyed to driving shaft 76, this latter passing through a bearing housing 77 secured to dished end 62, ball races or other suitable bearing means 78 being located within housing 77.

The driving shaft 76 at its outer end has pulley means 79 secured thereto, preferably of the type shown in Figure 11.

Belt means 80 connect the pulley 79 to the engine 7.

The complete apparatus (as in Figure 6) may be mounted by pivot means 72 on a suitable swivel arm or like (not shown) mounted on a lorry, container or such like, or on a tripod or pedestal or other obvious portable mounting means the pivot means 72 being so located as to give a balance of the apparatus to enable an easy lift of the drum end by the handle means 74.

In operation describing first of all the apparatus of Figures 1 to 5, with the engine 7 or like in motion the shaft 26 of flanged pulley 19 will be rotated by its drive pulley 25 and the belt 24 will rotate the rotor 8 in the direction as indicated by the arrow in Figure 3.

Thus the rotor boss 13 will rotate and pulley 15 will cause pulley 58 to also rotate so that the crankpin 57 of the latter will cause reciprocating motion of the arm 55 (Figure 5) and also shaker shaft 44.

These reciprocating motions of shaker shaft 44 will cause its downward arms 43 to move the screen 41 and its attached parts outwardly while the upward arms 53 cause the feeder 52 to move inwardly and vice versa.

Thus the spoil or the like put on screen 41 will be sieved and fall to the feeder 52 which will deliver it to the rotor 8, stones or pieces of substance of excessive size which may be too large for the rotor being prevented from passing through by the screen 41.

The spoil on falling from the feeder meets the travelling belt 24 and encounters the rotor blades 17 and as the optimum peripheral speed of the rotor would be approximately 1700 feet per minute, (for a 15 inch rotor) the spoil would be thrown from between the discs 10 and 11, where the belt 24 passes from same, with sufficient force to cause it to fly through chute 9 to the top section 29 which would be adjusted by the lever 36 to deflect said spoil to a downward course where desired.

Due to the chute 9 conforming to the natural trajectory of the flying spoil, the latter should pass therethrough without excessive rebound and for the purpose of obtaining minimum rebound the chute angle may be varied by the adjustment means 31 on the stays 30.

If any material should fail to pass up the chute 9, it will fall back along bottom 34 and through return opening 32 to the run back chute 50 which returns it to the screen 41 for further sieving.

Obviously the screen 41 and feeder 52 are not essential to the operation of the rotor 8 and chute 9 in that spoil could be shovelled direct to the rotor 8 through its admission hole 16.

The operation of the loader of Figures 6 to 11 is substantially the same as that described for Figures 1 to 5 with the elimination of the screen and feeder, the engine 7 driving the rotor 8 in the direction of the arrow of Figure 7 at an optimum speed (about 300 R.P.M. in the case of a two foot diameter rotor) the spoil or other substances being fed into the drum 59 by way of the admission hole 16a in retaining ring 63.

The spoil in falling towards the bottom of the drum 59 encounters the blades 17 which carry and throw the spoil through the gap 60 with sufficient force to cause it to fly through the chute 9 to the top discharge end thereof where the tongue 69 is encountered which deflects the spoil to a desired downward course by manipulation of the lever means 70.

Due to the chute 9 conforming to the natural trajectory of the flying spoil, the latter should pass therethrough without excessive rebound from either bottom 34 or top 39 and by moving the chute 9 peripherally around the drum 59 as allowed for by the slotted holes 68 the best position for most effective operation can be obtained.

It will be obvious that the loader as shown in Figure 6 could be mounted in a frame 1 as in Figure 1, the drum 59 being rigidly secured to the frame 1. Therefore with such modification, the screen 41 and feeder 52 could be applied to the apparatus, using the drum 59 in place of the belt 24 as the means for retaining the material within the rotor for a desired portion of the rotation thereof. (Alternatively a screen and feed mechanism could be attached to retaining ring 63 directly in front of opening 16A).

Having now particularly described and ascertained the nature of my said invention and in what manner the same is to be performed I declare that what I claim is:—

1. Apparatus for loading or dumping spoil or other suitable materials comprising a frame, a rotor mounted therein and having an admission hole in the side and having a discharge at its top and an elongated sectional discharging chute including an inner section adjustably secured to the frame and arranged about the discharge opening, an intermediate section, a removable bottom for the intermediate section of the chute, the bottom of the intermediate section being spaced from the bottom of the inner section to provide a return opening, an outer section, means for adjusting the position of the outer section relative to the inner section, and the outer section having the bottom entirely removed and being curved for controlling the downward deflection of the material as it is discharged.

2. Apparatus for loading or dumping spoil or other suitable materials comprising a frame, a rotor mounted therein and having an admission hole in the side and having a discharge at its top and an elongated sectional discharging chute including an inner section adjustably secured to the frame and arranged about the discharge opening, an intermediate section, a removable bottom for the intermediate section of the chute, the bottom of the intermediate section being spaced from the bottom of the inner section to provide a return opening, an outer section, means for adjusting the position of the outer section relative to the inner section, the outer section having the bottom entirely removed and being curved for controlling the downward deflection of the material as it is discharged, means for feeding material to the admission hole in the side of the rotor and a return chute fixed to the frame and extending from a point beneath the return opening in the lower end of the intermediate section of the discharging chute back to the feeding means.

3. Apparatus for loading or dumping spoil or other suitable materials comprising in combination a rotor projecting device including a vertically disposed rotor having an admission hole in the side and an elongated chute extending upwardly from the top, of means for screening the material and feeding the screened material into the rotor including frame means pivotally supported near the admission hole side of the rotor, a flat screen on the frame means, a feeding tray below said screen with its lower end projecting through the admission hole and into the said rotor, guide plates secured to the screen to direct the screened material to the feeding tray, means for causing reciprocal motion of said screen and said tray including a power driven oscillatory shaker shaft, arms extending downwardly from the shaft and connected to the screen frame, and arms extending upwardly from the shaker shaft and connected to the lower end of the tray.

CHARLES WILLIAM FEILDEN HAMILTON.